US 7,640,359 B1

(12) United States Patent
Gilmartin

(10) Patent No.: US 7,640,359 B1
(45) Date of Patent: Dec. 29, 2009

(54) METHOD, SYSTEM AND COMPUTER PROGRAM PRODUCT FOR FACILITATING THE DESIGN AND ASSIGNMENT OF ETHERNET VLANS

(75) Inventor: Neil Gilmartin, Atlanta, GA (US)

(73) Assignee: AT&T Intellectual Property, I, L.P., Wilmington, DE (US)

( * ) Notice: Subject to any disclaimer, the term of this patent is extended or adjusted under 35 U.S.C. 154(b) by 853 days.

(21) Appl. No.: 10/666,069

(22) Filed: Sep. 19, 2003

(51) Int. Cl.
*G06F 15/173* (2006.01)

(52) U.S. Cl. .................... 709/244; 726/15
(58) Field of Classification Search .......... 709/238, 709/244, 241, 242; 726/15
See application file for complete search history.

(56) References Cited

U.S. PATENT DOCUMENTS

| | | | |
|---|---|---|---|
| 4,926,418 A | | 5/1990 | Cidon et al. |
| 5,216,591 A | | 6/1993 | Nemirovsky et al. |
| 5,684,800 A | * | 11/1997 | Dobbins et al. ........... 370/401 |
| 5,774,876 A | | 6/1998 | Woolley et al. |
| 5,804,810 A | | 9/1998 | Woolley et al. |
| 5,825,772 A | * | 10/1998 | Dobbins et al. ........... 370/396 |
| 5,867,494 A | | 2/1999 | Krishnaswamy et al. |
| 5,867,495 A | | 2/1999 | Elliott et al. |
| 5,892,441 A | | 4/1999 | Woolley et al. |
| 5,946,308 A | * | 8/1999 | Dobbins et al. ........... 370/392 |
| 5,949,788 A | | 9/1999 | Friedman et al. |
| 5,959,568 A | | 9/1999 | Woolley |
| 5,979,757 A | | 11/1999 | Tracy et al. |
| 5,999,525 A | | 12/1999 | Krishnaswamy et al. |
| 6,044,075 A | | 3/2000 | Le Boudec et al. |
| 6,084,528 A | | 7/2000 | Beach et al. |
| 6,092,113 A | | 7/2000 | Maeshima et al. |
| 6,104,701 A | * | 8/2000 | Avargues et al. ........... 370/238 |
| 6,112,251 A | * | 8/2000 | Rijhsinghani ............... 709/249 |
| 6,147,995 A | * | 11/2000 | Dobbins et al. ............ 370/392 |
| 6,151,324 A | * | 11/2000 | Belser et al. ................ 370/397 |

(Continued)

OTHER PUBLICATIONS

IEEE Std. 802.1Q-1998, "IEEE Standards for Local and Metropolitan Area Networks: Virtual Bridged Local Area Networks", New York, NY, 1999. Introduction—Chapter 7.*

(Continued)

*Primary Examiner*—Andrew Caldwell
*Assistant Examiner*—Jason Recek
(74) *Attorney, Agent, or Firm*—Cantor Colburn LLP

(57) ABSTRACT

A method for facilitating the design and assignment of Ethernet VLANs. The method includes receiving a VLAN name, a class of service and two or more access ports. The switches and trunks associated with the access ports are determined. A VLAN database is searched for the VLAN. A VLAN is created if the searching does not result in locating the VLAN. Creating the VLAN includes selecting a starting access port from the two or more access ports. A base path is mapped from the starting access port to another of the access ports. The base path includes one or more of the switches and one or more of the trunks. The base path is added to the VLAN and includes the starting access port and the other access ports. For each of the two or more access ports not currently located in the VLAN a new path is mapped from the access port to one of the switches in the VLAN. In addition, a new path is added to the VLAN including the access port. The VLAN is then transmitted to the VLAN database.

23 Claims, 4 Drawing Sheets

U.S. PATENT DOCUMENTS

| | | | |
|---|---|---|---|
| 6,199,753 | B1 | 3/2001 | Tracy et al. |
| 6,208,649 | B1 * | 3/2001 | Kloth .......................... 370/392 |
| 6,335,927 | B1 | 1/2002 | Elliott et al. |
| 6,363,319 | B1 * | 3/2002 | Hsu ............................ 701/202 |
| 6,374,307 | B1 | 4/2002 | Ristau et al. |
| 6,377,551 | B1 * | 4/2002 | Luo et al. ................... 370/238 |
| 6,522,641 | B1 | 2/2003 | Siu et al. |
| 6,550,672 | B1 | 4/2003 | Tracy et al. |
| 6,597,214 | B1 | 7/2003 | Singh et al. |
| 6,631,019 | B1 | 10/2003 | Vujkovic-Cvijin et al. |
| 6,633,573 | B1 | 10/2003 | Ben-Zur et al. |
| 6,681,232 | B1 | 1/2004 | Sistanizadeh et al. |
| 6,687,339 | B2 | 2/2004 | Martin |
| 6,690,848 | B2 | 2/2004 | Graves et al. |
| 6,697,793 | B2 | 2/2004 | McGreevy |
| 6,721,728 | B2 | 4/2004 | McGreevy |
| 6,731,832 | B2 | 5/2004 | Alvarez et al. |
| 6,741,615 | B1 | 5/2004 | Patwardhan et al. |
| 6,741,981 | B2 | 5/2004 | McGreevy |
| 6,754,174 | B1 | 6/2004 | Ben-Zur et al. |
| 6,754,181 | B1 | 6/2004 | Elliott et al. |
| 6,763,025 | B2 | 7/2004 | Leatherbury et al. |
| 6,778,498 | B2 | 8/2004 | McDysan |
| 6,804,199 | B1 | 10/2004 | Kelly et al. |
| 6,912,232 | B1 | 6/2005 | Duffield et al. |
| 6,914,905 | B1 * | 7/2005 | Yip et al. ................ 370/395.53 |
| 6,976,087 | B1 * | 12/2005 | Westfall et al. ............. 709/238 |
| 7,028,083 | B2 | 4/2006 | Levine et al. |
| 7,092,389 | B2 | 8/2006 | Chase et al. |
| 7,185,077 | B1 | 2/2007 | O'Toole et al. |
| 2001/0003833 | A1 | 6/2001 | Tomizawa et al. |
| 2002/0031142 | A1 | 3/2002 | Metin et al. |
| 2002/0042274 | A1 | 4/2002 | Ades |
| 2002/0054595 | A1 | 5/2002 | Ambe et al. |
| 2002/0110087 | A1 | 8/2002 | Zelig et al. |
| 2002/0120727 | A1 | 8/2002 | Curley et al. |
| 2002/0126690 | A1 | 9/2002 | Narayana et al. |
| 2002/0191250 | A1 | 12/2002 | Graves et al. |
| 2003/0067928 | A1 * | 4/2003 | Gonda ........................ 370/401 |
| 2003/0149788 | A1 | 8/2003 | Saint Etienne et al. |
| 2003/0169694 | A1 * | 9/2003 | Seaman ...................... 370/254 |
| 2003/0172188 | A1 | 9/2003 | Hasegawa et al. |
| 2004/0042416 | A1 | 3/2004 | Ngo et al. |
| 2004/0058652 | A1 | 3/2004 | McGregor et al. |
| 2004/0062198 | A1 | 4/2004 | Pedersen et al. |
| 2004/0081180 | A1 | 4/2004 | De Silva et al. |
| 2004/0098500 | A1 | 5/2004 | Liu et al. |
| 2004/0103282 | A1 | 5/2004 | Meier et al. |
| 2004/0105459 | A1 | 6/2004 | Mannam |
| 2004/0146006 | A1 | 7/2004 | Jackson |
| 2004/0196790 | A1 | 10/2004 | Balakrishnan et al. |
| 2004/0210623 | A1 | 10/2004 | Hydrie et al. |
| 2004/0221042 | A1 | 11/2004 | Meier |
| 2004/0246976 | A1 | 12/2004 | Balakrishnan et al. |
| 2004/0249916 | A1 | 12/2004 | Graves et al. |
| 2005/0021766 | A1 | 1/2005 | McKeowen et al. |
| 2005/0027851 | A1 | 2/2005 | McKeown et al. |
| 2005/0066036 | A1 | 3/2005 | Gilmartin et al. |
| 2005/0122983 | A1 | 6/2005 | Gilmartin et al. |
| 2006/0013231 | A1 | 1/2006 | Matthews et al. |
| 2006/0062211 | A1 | 3/2006 | Manthoulis et al. |

OTHER PUBLICATIONS

Kurose, James and Keith Ross, "Computer Networking, A Top-Down Approach Featuring the Internet", 2001, Addison Wesley Longman, Inc., pp. 280-281.*

U.S. Appl. No. 10/720,644, filed Nov. 24, 2003, Neil Gilmartin et al.

U.S. Appl. No. 10/667,009, filed Sep. 19, 2003, Neil Gilmartin et al.

Martin, Richard P., et al. "Effects of Communication Latency, Overhead, and Bandwidth in a Cluster Architecture." University of California, Berkeley: Computer Science Division. International Symposium on Computer Architecture: pp. 85-97; 1997.

Fineburg, Victoria. "A Practical Architecture for Implementing End-to-End QoS in an IP Network." IEEE Communications Magazine: pp. 122-130. Jan. 2002.

* cited by examiner

METHOD, SYSTEM AND COMPUTER PROGRAM PRODUCT FOR FACILITATING THE DESIGN AND ASSIGNMENT OF ETHERNET VLANS

FIELD OF THE INVENTION

The present disclosure relates generally to facilitating the design and assignment of Ethernet VLANs and in particular, to a method of designing new VLANs and adding access ports to existing VLANs.

BACKGROUND OF THE INVENTION

Computer networks carry data between various devices. The data may be carried in connection-based links, such as the virtual circuits in an Asynchronous Transfer Mode (ATM) network. Data may also be carried between devices in network segments where data is broadcast to all of a plurality of devices on the segment via a broadcast-type medium. An example of the latter is an Ethernet network. It is typically convenient to set up local area networks (LANs) using a broadcast type medium over which devices can share data.

In some circumstances, for example, where a LAN is required to connect devices that are geographically distant from one another, the LAN may be broken into separate segments. Within each segment, devices (e.g., switches) can exchange data by way of a broadcast-type medium. The segments may be connected to one another by way of connection-based links such as physical transport lines. Such a LAN may be referred to as a virtual LAN (VLAN). A VLAN may be thought of as a logical web of connections over physical transports.

Metro-Ethernet networks are based on VLANs within the Ethernet network of a given metropolitan area. In order to provide this service to a customer, a service provider must design and assign a virtual network within the physical network for the customer. The VLAN creator is typically supplied with a VLAN name, a class of service (COS) for the VLAN and a certain number of access ports on the service provider Ethernet switches with the bandwidth (BW) required for each port. After the initial creation of the VLAN, access ports may be added or removed from the VLAN. Currently, the design of the VLAN and the assignment of access ports is performed manually with expert technicians attempting to take many constraints into consideration (e.g., BW required for each port, COS, layout of switches, layout of trunks, no loops allowed in VLAN, topology of VLAN). As VLANs become larger and more complex it becomes difficult and time consuming for technicians to manually design and assign VLANs.

BRIEF DESCRIPTION OF THE INVENTION

Embodiments of the present invention include a method for facilitating the design and assignment of Ethernet VLANs. The method includes receiving a VLAN name, a class of service and two or more access ports. The switches and trunks associated with the access ports are determined. A VLAN database is searched for the VLAN. A VLAN is created if the searching does not result in locating the VLAN. Creating the VLAN includes selecting a starting access port from the two or more access ports. A base path is mapped from the starting access port to another of the access ports. The base path includes one or more of the switches and one or more of the trunks. The base path is added to the VLAN and includes the starting access port and the other access ports. For each of the two or more access ports not currently located in the VLAN a new path is mapped from the access port to one of the switches in the VLAN. In addition, a new path is added to the VLAN including the access port. The VLAN is then transmitted to the VLAN database.

Other embodiments of the present invention include a system for facilitating the design and assignment of Ethernet VLANs. The system includes a network and a storage device in communication with the network. The storage device includes a VLAN database. The system further includes a user system in communication with the network and a host system in communication with the network. The host system includes application software to implement a method. The method includes receiving a VLAN name, a class of service and two or more access ports. The switches and trunks associated with the access ports are determined. A VLAN database is searched for the VLAN. A VLAN is created if the searching does not result in locating the VLAN. Creating the VLAN includes selecting a starting access port from the two or more access ports. A base path is mapped from the starting access port to another of the access ports. The base path includes one or more of the switches and one or more of the trunks. The base path is added to the VLAN and includes the starting access port and the other access ports. For each of the two or more access ports not currently located in the VLAN a new path is mapped from the access port to one of the switches in the VLAN. In addition, a new path is added to the VLAN including the access port. The VLAN is then transmitted to the VLAN database.

Further embodiments of the present invention include a computer program product for facilitating the design and assignment of Ethernet VLANs including a storage medium readable by a processing circuit and storing instructions for execution by the processing circuit for facilitating a method including receiving a VLAN name, a class of service and two or more access ports. The switches and trunks associated with the access ports are determined. A VLAN database is searched for the VLAN. A VLAN is created if the searching does not result in locating the VLAN. Creating the VLAN includes selecting a starting access port from the two or more access ports. A base path is mapped from the starting access port to another of the access ports. The base path includes one or more of the switches and one or more of the trunks. The base path is added to the VLAN and includes the starting access port and the other access ports. For each of the two or more access ports not currently located in the VLAN a new path is mapped from the access port to one of the switches in the VLAN. In addition, a new path is added to the VLAN including the access port. The VLAN is then transmitted to the VLAN database.

Other systems, methods and/or computer program products according to embodiments will be or become apparent to one with skill in the art upon review of the following drawings and detailed description. It is intended that all such additional systems, methods, and/or computer program products be within the scope of the present invention, and be protected by the accompanying claims.

BRIEF DESCRIPTION OF THE DRAWINGS

Referring to the exemplary drawings wherein like elements are numbered alike in the several FIGURES.

DETAILED DESCRIPTION OF THE INVENTION

Figure 1:
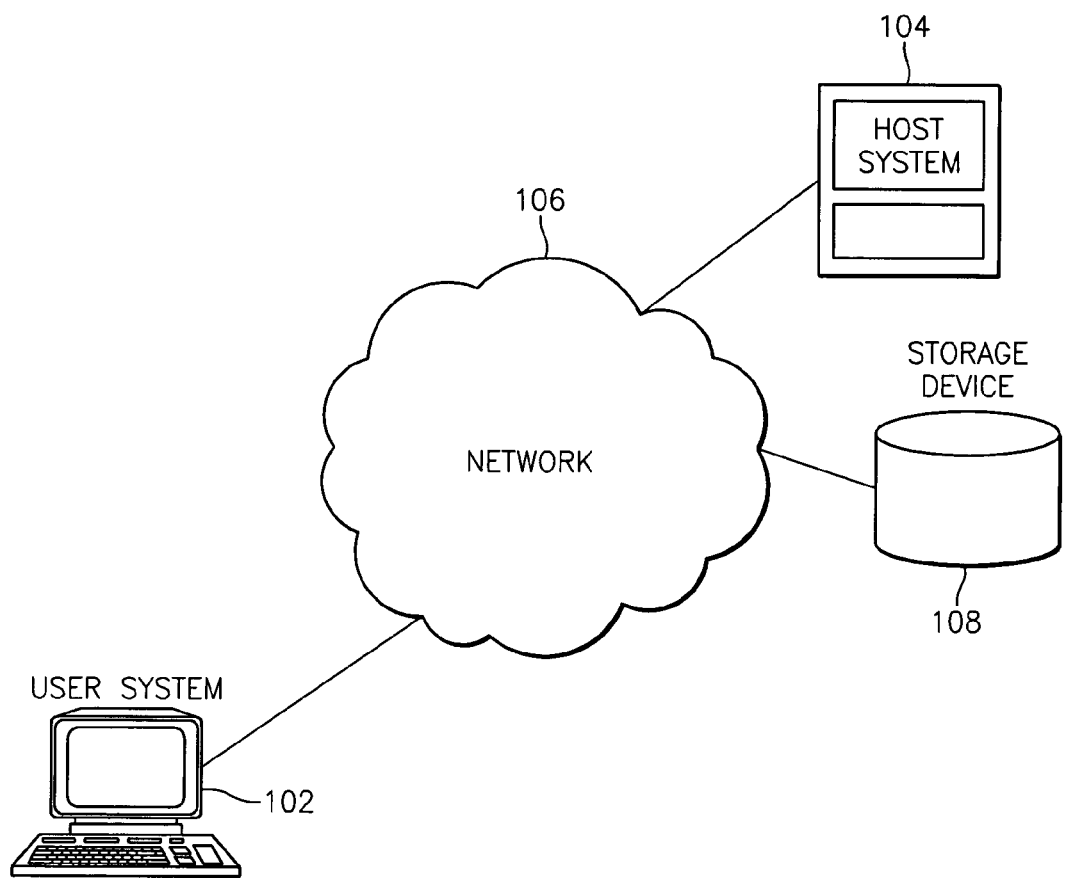
FIG. 1 is a block diagram of an exemplary system for facilitating the design and assignment of Ethernet VLANs in accordance with exemplary embodiments of the present invention.

Embodiments of the present invention facilitate the design and assignment functions for creating new VLANs and adding access ports to existing VLANs. Trunks, or physical transport lines, connecting the switches containing access ports in a VLAN are selected by taking a number of assumptions and constraints into account. The service provider Ethernet topology (e.g., the layout of switches and trunks that connect them together) is one such constraint. The Ethernet network may be of any topological configuration such as hub and spoke, mesh or hybrid. A given VLAN instance on the network is assumed to be of a tree structure. This means that there are not any loops in the VLAN configuration (i.e., there can never be two different paths between any two points in the VLAN). A consequence of not having loops in the VLAN configuration is that for any given trunk in the VLAN, all access ports in the VLAN are divided into two non-overlapping sets. This in turn allows capacity management to be based on a least contribution algorithm. In addition, as new access ports are added to a VLAN, the tree structure is assured by the system by never allowing any new path added to continue beyond the first point of contact with the existing VLAN. Exemplary embodiments of the present invention receive a VLAN name, a COS and two or more access ports to be connected into the VLAN. If the VLAN does not currently exist, the first two ports are connected with a least cost path between them to form the base VLAN. Once a VLAN exists, access ports are connected into the VLAN with a least cost path to other access ports in the VLAN. The cost of a path may be determined by adding the cost of each trunk in the path.

Exemplary embodiments of the present invention calculate hub values and total hub values. The hub values are associated with each switch in the VLAN. The total hub value is the sum of the hub values for all the switches in the VLAN. The total hub value is calculated by exemplary embodiments of the present invention whenever more than one path is possible from a new access port into the VLAN. By minimizing this value, the VLAN is kept efficient and traffic transport is economized.

Exemplary embodiments of the present invention operate in the context of an operating support system (OSS) that manages metro-Ethernet services. The OSS system may provide the context of network intelligence and capacity tracking counters and control parameters that govern the logic of the design and assign algorithm. In exemplary embodiments of the present invention, the OSS has a database of network elements and trunks connecting them so that it can determine all of the network elements connected to any given network element. In addition, the OSS has a database of existing VLANs such that the VLAN names are unique across the region and each existing VLAN has an accessible list of network elements already in the connection paths of that VLAN. In addition, the OSS will provide capacity numbers to exemplary embodiments of the present invention to determine if there is enough available bandwidth on the trunk to add an access port with a specified bandwidth requirement and enough capacity on the switch to add another access port.

FIG. 1 is a block diagram of an exemplary system for facilitating the design and assignment of Ethernet VLANs in accordance with exemplary embodiments of the present invention. The exemplary system includes a host system 104 for executing an Ethernet VLAN design and assignment application. The system in FIG. 1 also includes one or more user systems 102 through which VLAN technicians located at one or more geographic locations may contact the host system 104 to initiate the execution of the design and assignment application. In exemplary embodiments of the present invention, the host system 104 executes the design and assignment application and the user system 102 is coupled to the host system 104 via a network 106. In alternate exemplary embodiments, the user system 102 is directly connected to the host system 104. Each user system 102 may be implemented using a general-purpose computer executing a computer program for carrying out the processes described herein. The user system 102 may be a personal computer (e.g., a lap top, a personal digital assistant) or a host attached terminal. If the user system 102 is a personal computer, the processing described herein may be shared by a user system 102 and the host system 104 (e.g., by providing an applet to the user system 102).

The network 106 may be any type of known network including, but not limited to, a wide area network (WAN), a local area network (LAN), a global network (e.g. Internet), a virtual private network (VPN), and an intranet. The network 106 may be implemented using a wireless network or any kind of physical network implementation known in the art. A user system 102 may be coupled to the host system 104 through multiple networks (e.g., intranet and LAN) so that not all user systems 102 are coupled to the host system 104 through the same network. One or more of the user systems 102 and the host system 104 may be connected to the network 106 in a wireless fashion.

The storage device 108 depicted in FIG. 1 may be implemented using a variety of devices for storing electronic information. It is understood that the storage device 108 may be implemented using memory contained in the host system 104 or it may be a separate physical device. The storage device 108 is logically addressable as a consolidated data source across a distributed environment that includes a network 106. The physical data may be located in a variety of geographic locations depending on application and access requirements. Information stored in the storage device 108 may be retrieved and manipulated via the host system 104. The storage device 108 includes interim data utilized to perform the design and assignment of an Ethernet VLAN as well as the resulting VLAN layout. In addition, the storage device 108 includes access to operational data such as a database of network elements and trunks, a database of existing VLANs and the network elements associated with the VLANs, and capacity data for the trunks and switches. The storage device 108 may also include other kinds of data such as information concerning the creation and update of the VLAN layouts (e.g., date, time of creation/update and technician identification). In exemplary embodiments of the present invention, the host system 104 operates as a database server and coordinates access to application data including data stored on storage device 108. Access to data contained storage device 108 may be restricted based on user characteristics.

The host system 104 depicted in FIG. 1 may be implemented using one or more servers operating in response to a computer program stored in a storage medium accessible by the server. The host system 104 may operate as a network server (e.g., a web server) to communicate with the user system 102. The host system 104 handles sending and receiving information to and from the user system 102 and can perform associated tasks. The host system 104 may reside behind a firewall to prevent unauthorized access to the host system 104 and enforce any limitations on authorized access. A firewall may be implemented using conventional hardware and/or software as is known in the art.

The host system 104 may also operate as an application server. The host system 104 executes one or more computer programs to facilitate the design and assignment of an Ethernet VLAN. One or more application programs within the host system 104 share information to support the design and assignment process. The processing of the design and assignment application may be shared by a user system 102 and the host system 104 by providing an application (e.g., a java applet) to the user system 102. As previously described, it is understood that separate servers may be utilized to implement the network server functions and the application server functions. Alternatively, the network server, the firewall, and the application server may be implemented by a single server executing computer programs to perform the requisite functions.

Figure 2:
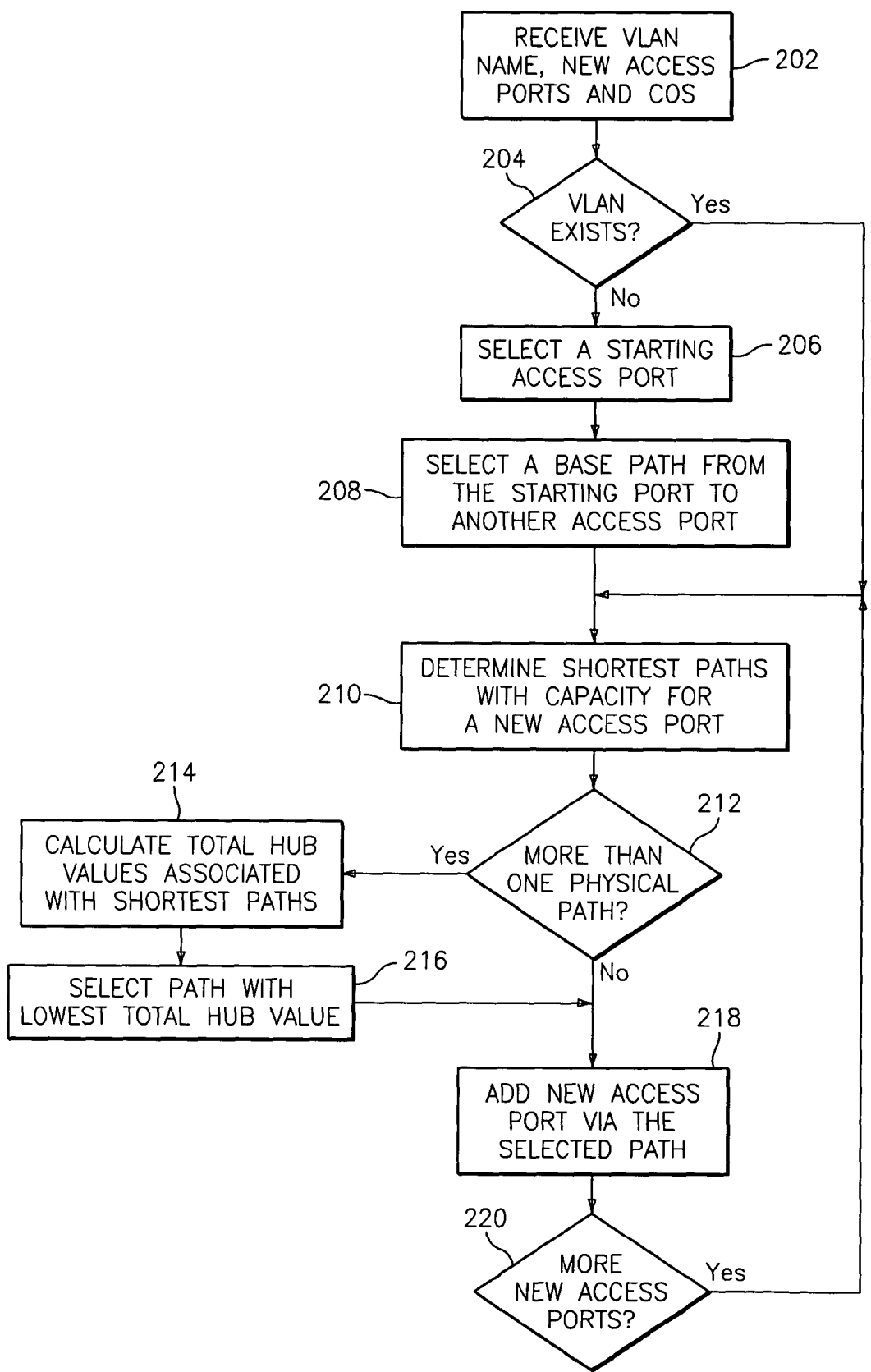
FIG. 2 is a flow diagram of an exemplary process for facilitating the design and assignment of Ethernet VLANs in accordance with exemplary embodiments of the present invention.

FIG. 2 is a flow diagram of an exemplary process for facilitating the design and assignment of Ethernet VLANs in accordance with exemplary embodiments of the present invention. At step 202, a VLAN name, COS and two or more access ports are received. At step 204, it is determined if the VLAN already exists. In exemplary embodiments of the present invention this may be performed by accessing an operational database that includes a listing of currently existing VLANs. In addition, the operational database may include the network elements (e.g. switches) and access ports (including bandwidths) within each VLAN. If the VLAN exists, as determined at step 204, then step 210 is performed to add the access port(s) to the VLAN. The access ports are physically located on switches. Otherwise, if the VLAN does not currently exist, step 206 is performed to start creating a VLAN from the access ports received at step 202. At step 206, a starting access port is selected. Unless otherwise instructed, any access port may be selected from the access ports received at step 202 to be the starting access port. Next, at step 208, a base path is selected from the starting access port to another access port received at step 202. A list of potential paths (including a list of switches) is created, by listing the shortest path (least number of hops from access port to access port) from the starting access port to a subset of the access ports received at step 202. A pre-selected number (e.g., up to 4) of the access ports located on different switches may be randomly selected to be included in the subset or the subset may be selected based on other criteria. The longest path from the starting access port to any of the subset of access ports is then selected for a base path for the VLAN. If there are one or more longest path candidates, any of them may be selected as the base path for the VLAN. The bandwidth on one side and the other of each trunk in the base path is calculated. In addition, the contribution of the base VLAN to each trunk is calculated and capacity counters are updated.

Next, starting at step 210, a loop is performed to add each new access port received at step 202 to the existing VLAN. At step 210, a list of the possible physical paths from the new access port to a switch in the VLAN is created. The list only contains those physical transport lines and switches that contain capacity for the new access port. The capacity may be verified against data from an operational support system for tracking capacity. Next, at step 212, it is determined if there is more than one physical path from the new access port to a switch contained in the VLAN. If there is more than one physical path, then step 214 is performed to calculate the total hub value associated with each of these physical paths. At step 216, the path resulting in the lowest total hub value is selected. The new access port is connected to the VLAN via the selected path at step 218. In addition, the BW contribution is calculated and capacity is checked. If more access ports remain to be connected into the VLAN, as determined at step 220, then the process of adding an access port, starting at step 210 is repeated. If there are no more access ports to connect into the VLAN, as determined at step 220, then the processing is complete. When the design and assignment of the VLAN has been completed, the design may be transmitted to an operational support system to implement the design. Implementing may include provisioning the VLAN and making it available to the customer.

Figure 3:
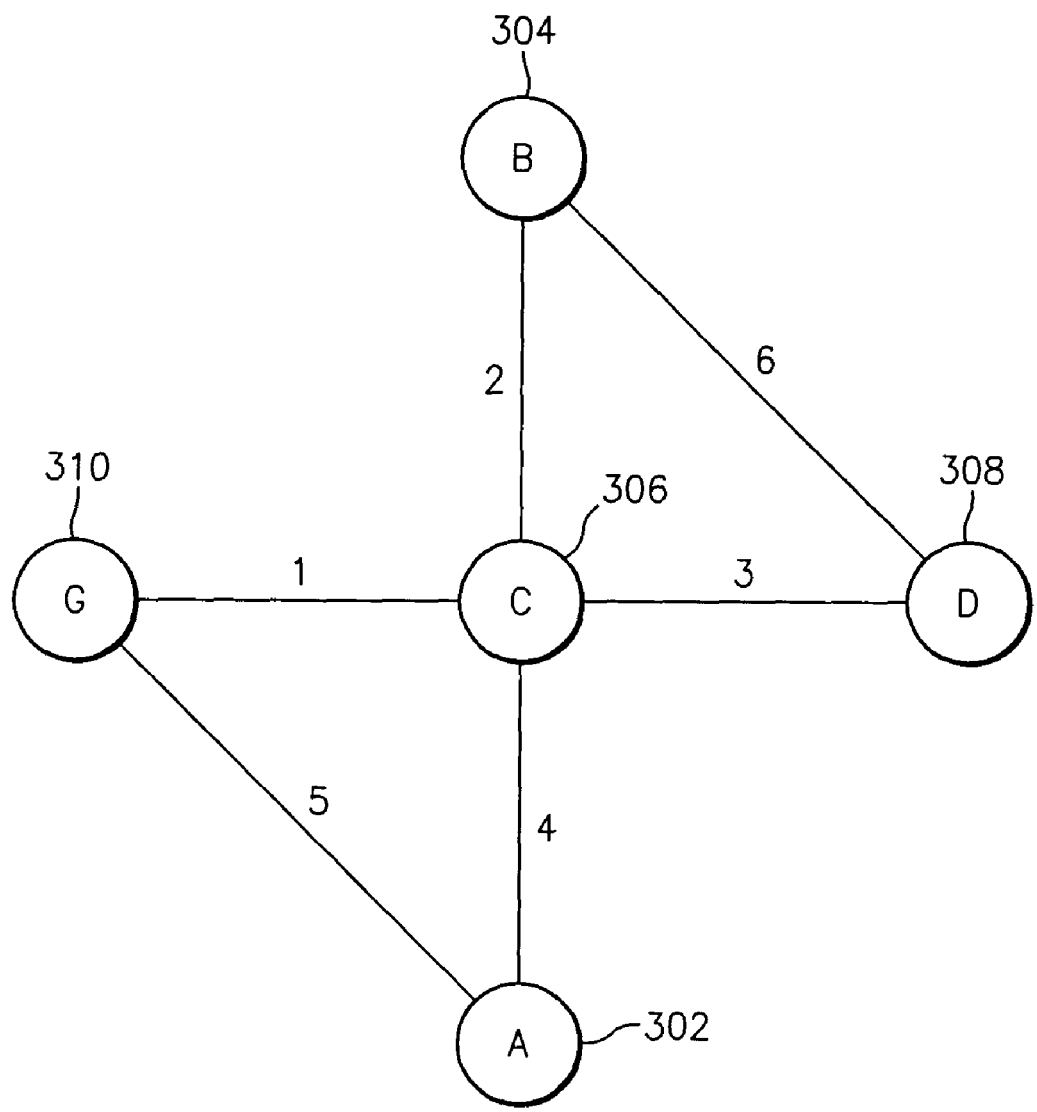
FIG. 3 is a block diagram of switches and physical transport lines that may be utilized in exemplary embodiments of the present invention.

In the following example, a simplified Ethernet VLAN is created using exemplary embodiments of the present invention. The example is simplified to show how exemplary embodiments of the present invention may operate, however, a typical Ethernet VLAN may include twenty or more access ports. FIG. 3 is a block diagram of switches and physical transport lines that may be utilized in exemplary embodiments of the present invention. The block diagram includes switch A 302, switch B 304, switch C 306, switch D 308 and switch G 310 connected via various paths by physical transport lines labeled "1" through "6."

In this example, it is assumed that that VLAN is new and that the input data includes a the VLAN name "Sample", a COS (e.g., Best Effort, Committed BW, Priority Plus) and four access ports: access port "a" 402 located at switch A 302 with a 100 Megabyte (M) bandwidth; access port "b" 404 located at switch B 304 with a 100 M bandwidth; access port "d" 408 located at switch D 308 with a 100 M bandwidth; access port "g" 410 located at switch G 310 with a 100 M bandwidth. A starting access port, access port "g" 410 is selected at random (see step 206 in FIG. 2). Next, a base path from the starting access port to another access port is selected (see step 208 in FIG. 2). Paths from access port "g" 410 to the other access ports include: switch G 310 to switch A 302 (GA); switch G 310 to switch C 306 to switch B 304 (GCB); and switch G 310 to switch C 306 to switch D 308 (GCD). Because there are two paths that include three switches (GCB, GCD), one of them "GCD" is selected at random as a base path for the Sample VLAN.

Now, each of the other access ports is connected into the Sample VLAN (see step 210 in FIG. 2). Access port "a" 402 is randomly selected to be connected to the sample VLAN first. Physical transport line "4" connects access port "a" 402 to switch C 306 which is included in the VLAN. In addition, physical transport line "5" connects access port "a" 402 to switch G 310 which is also included in the VLAN. These are the only two physical transport lines out of the switch A 302 where access port "a" 402 is located. The next hop on both of these transport lines is a VLAN network element so a decision about which to use is made by calculating the total hub value associated with each possibility (see step 214 in FIG. 2) if both have the capacity to handle a BW of 100 M for the request COS. The total hub value associated with connecting switch A 302 to switch G 310 (AG) may be calculated as follows:

| Switch | Current Hub Value | Additional Value | New Hub Value |
|---|---|---|---|
| G | 200 (DCG) | 100 (AG) | 300 |
| C | 200 (GC, DC) | 200 (AGC) | 400 |
| D | 200 (GCD) | 300 (AGCD) | 500 |
| TOTAL HUB VALUE for AG | | | 1200 |

Similarly, the total hub value associated with connecting switch A 302 to switch C 306 (AC) may be calculated as follows:

| Switch | Current Hub Value | Additional Value | New Hub Value |
|---|---|---|---|
| G | 200 (DCG) | 200 (ACG) | 400 |
| C | 200 (GC, DC) | 100 (AC) | 300 |
| D | 200 (GCD) | 200 (ACD) | 400 |
| TOTAL HUB VALUE for AC | | | 1100 |

Therefore, because it results in a lower total hub value, the path from switch A 302 to switch C 306 (AC) is selected for access port "a" 402. This path is then added to the VLAN (see step 218 in FIG. 2).

One more access port remains to be connected to the Sample VLAN (see step 220 in FIG. 2). The process of connecting access port "b" 404 to the VLAN begins by determining the shortest path with capacity to connect into the existing VLAN (see step 210 in FIG. 2). Physical transport line "6" connects access port "b" 404 to switch D 308 which is included in the VLAN. In addition, physical transport line "2" connects access port "b" 404 to switch C 306 which is included in the VLAN. These are the only two physical transport lines out of the switch B 304 where access port "b" 404 is located. The next hop on both of these transport lines is a VLAN network element so a decision about which to use is made by calculating the total hub value associated with each possibility (see step 214 in FIG. 2) if both have capacity to handle a BW of 100 M for the requested COS. The total hub value associated with connecting switch B 304 to switch D 308 (BD) may be calculated as follows:

| Switch | Current Hub Value | Additional Value | New Hub Value |
|---|---|---|---|
| G | 400 (DCG, ACG) | 300 (BDCG) | 700 |
| C | 300 (GC, AC, DC) | 200 (BDC) | 500 |
| D | 400 (GCD, ACD) | 100 (BD) | 500 |
| A | 400 (GCA, DCA) | 300 (BDCA) | 700 |
| TOTAL HUB VALUE for BD | | | 2400 |

Similarly, the total hub value associated with connecting switch B 304 to switch C 306 (BC) may be calculated as follows:

| Switch | Current Hub Value | Additional Value | New Hub Value |
|---|---|---|---|
| G | 400 (DCG, ACG) | 200 (BCG) | 600 |
| C | 300 (GC, DC, AC) | 100 (BC) | 400 |
| D | 400 (GCD, ACD) | 200 (BCD) | 600 |
| A | 400 (GCA, DCA) | 200 (BCA) | 600 |
| TOTAL HUB VALUE for BC | | | 2200 |

Figure 4:
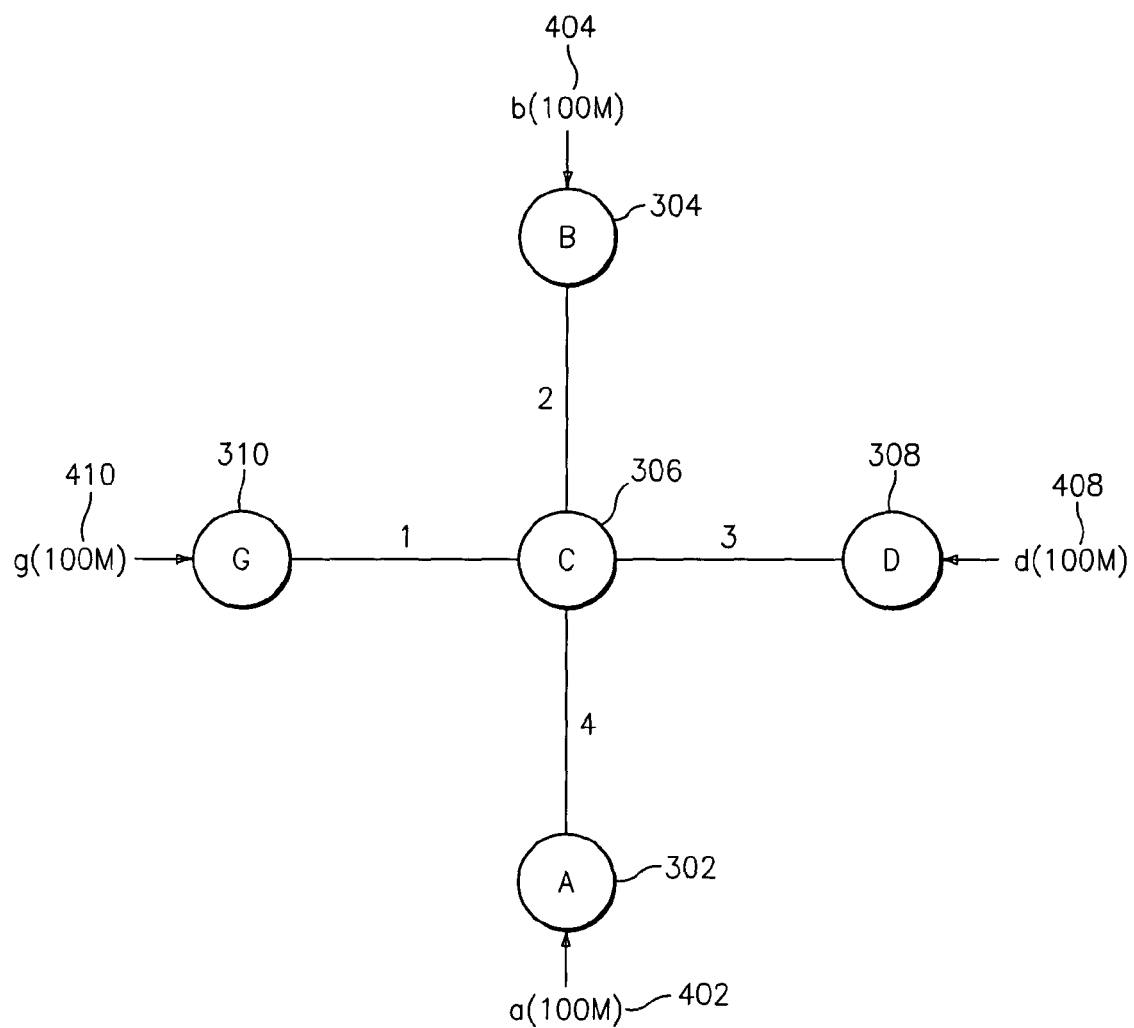
FIG. 4 is a block diagram of an exemplary VLAN that may be implemented utilizing the switches and physical transport lines depicted in FIG. 3.

Therefore, because it results in a lower total hub value, the path from switch B 304 to switch C 306 (BC) is selected for access port "b" 404. This path is then added to the VLAN (see step 218 in FIG. 2). FIG. 4 is a block diagram of the resulting exemplary VLAN that may be implemented utilizing exemplary embodiments of the present invention with the switches and physical transport lines depicted in FIG. 3.

Other exemplary embodiments of the present invention include receiving a switch that is designated as the hub switch as part of the input to the process depicted in FIG. 2. When a hub switch is designated, the connection of each access port includes finding the shortest available path from the switch associated with the access port to the hub switch. Otherwise, the processing is similar to that described in reference to FIG. 2. In other alternate exemplary embodiments of the present invention, the access ports require different BWs and this is taken account in determining the hub value when connecting a new access port. For example, if the BW of a particular access port is 200 M, then each hop from that access port would count as 200 in determining the hub values.

Other alternate exemplary embodiments may reflect different costs associated with each hop, or trunk, between switches. These may be factored into the determination of the paths utilized by a VLAN, resulting in selection of least cost paths rather than shortest paths. Different costs may be assigned to trunks to encourage the use of new technology that may be less expensive or conversely to recoup the additional costs that may be associated with a higher cost connection. Alternatively, costs may be increased on old technology that the service provider is attempting to phase out. The way that the costs are assigned to hops may be utilized to encourage the use of particular transport lines and to discourage the use of other transport lines.

Exemplary embodiments of the present invention allow the design and assignment of VLANs to be performed while taking into account a variety of factors including the BW required for each port, the requested COS, the layout of switches and trunks, the requirement for no loops in the VLAN, and the current topology of VLAN. This may lead to better VLAN designs and to more efficient utilization of the underlying trunks and switches. In addition, utilizing exemplary embodiments of the present invention may result in cost savings due to less expert technician time being required to design and assign VLANs.

As described above, the embodiments of the present invention may be embodied in the form of computer-implemented processes and apparatuses for practicing those processes. Embodiments of the present invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Exemplary embodiments of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for facilitating design and assignment of Ethernet VLANs, said method comprising:
    receiving a VLAN name, a class of service and two or more access ports, wherein a VLAN is a virtual local area network;
    determining switches and trunks associated with said access ports;
    searching a VLAN database for said VLAN;
    creating a VLAN if said searching does not result in locating said VLAN, wherein said creating includes:
        selecting a starting access port from said two or more access ports,
        mapping a base path from said starting access port to another of said access ports, wherein said base path includes one or more of said switches and one or more of said trunks, and
        adding said base path to said VLAN including said starting access port and said another of said access ports;
    for each said two or more access ports not currently located in the VLAN:
    mapping a new path from said access port to one of said switches in said VLAN,
        adding said new path to said VLAN including said access port, and
        transmitting said VLAN to said VLAN database; and
    adding a new access port to an existing VLAN, if said searching results in locating the existing VLAN, by:
        determining a list of shortest paths with capacity for said new access port,
        performing one of determining a lowest hub value, if there is more than one path in the list of shortest paths, and
        adding said new access port to the existing VLAN, if there is at least one physical path.

2. The method of claim 1 wherein said mapping a base path includes:
    selecting a pre-selected number of said two or more access ports;
    creating a list of least cost paths from said starting access port to each of said selected access ports, wherein each said path includes one or more of said switches and one or more of said trunks; and
    selecting a longest length path from said list for said base path.

3. The method of claim 2 wherein said pre-selected number is four.

4. The method of claim 2 wherein each said two or more access ports includes a corresponding bandwidth requirement and said mapping a base path further includes:
    determining if each said least cost path in said list has capacity for said bandwidth requirement corresponding to said another of said access ports; and
    deleting a least cost path from said list in response to said least cost path not having capacity.

5. The method of claim 4 wherein said determining includes receiving capacity data from an operational support system.

6. The method of claim 2 wherein each said two or more access ports includes a corresponding bandwidth requirement and said mapping a base path further includes:
    determining if each said least cost path in said list has capacity for said bandwidth requirement corresponding to said another of said access ports in said class of service; and
    deleting a least cost path from said list in response to said least cost path not having capacity.

7. The method of claim 6 wherein said determining includes receiving capacity data from an operational support system.

8. The method of claim 1 wherein said mapping a new path includes:
    creating a list of one or more least cost paths from said access port to one of said switches located in said VLAN;
    selecting the shortest length path from said list for said new path, wherein if there is more than one shortest length path then selecting the one resulting in a lowest total hub value for the VLAN for said new path.

9. The method of claim 8 wherein each said two or more access ports includes a corresponding bandwidth requirement and said mapping a new path further includes:
    determining if each said least cost path in said list has capacity for said bandwidth requirement corresponding to said access port; and
    deleting a least cost path from said list in response to said least cost path not having capacity.

10. The method of claim 9 wherein said determining includes receiving capacity data from an operational support system.

11. The method of claim 8 wherein calculating said total hub value includes:
    creating a list of least cost paths from each said switch in said shortest length path to each said switch in said VLAN; and
    calculating a total bandwidth transport required by said list of least cost paths, wherein said total bandwidth transport required is said total hub value.

12. The method of claim 8 wherein each said two or more access ports includes a corresponding bandwidth requirement and said mapping a new path further includes:
    determining if each said least cost path in said list has capacity for said bandwidth requirement corresponding to said access port in said class of service; and
    deleting a least cost path from said list in response to said least cost path not having capacity.

13. The method of claim 12 wherein said determining includes receiving capacity data from an operational support system.

14. The method of claim 1 wherein said base path is a least cost path.

15. The method of claim 1 wherein said new path is a least cost path.

16. The method of claim 1 further comprising receiving a hub switch and wherein each said two or more access ports are mapped to said hub switch.

17. The method of claim 1 wherein said trunks associated with said access ports include a relative cost value.

18. The method of claim 1 wherein said VLAN database includes a VLAN name field, VLAN trunk fields, VLAN switch fields and VLAN access port fields for each said VLAN.

19. A system for facilitating design and assignment of Ethernet VLANS, the system comprising:
   a network of switches and connecting trunks;
   a storage device in communication with said network, wherein said storage device includes a VLAN database, wherein a VLAN is a virtual local area network;
   a user system in communication with said network; and
   a host system in communication with said network, wherein said host system contains a computer readable storage medium including computer-executable instructions for facilitating design and assignment of Ethernet VLANs, wherein the computer-executable instructions when executed by a computer processor cause the computer processor to perform a method comprising:
      receiving a VLAN name via said network, a class of service and two or more access ports,
      determining switches and trunks associated with said access ports, searching said VLAN database for said VLAN,
      creating a VLAN if said searching does not result in locating said VLAN, wherein said creating includes:
         selecting a starting access port from said two or more access ports,
         mapping a base path from said starting access port to another of said access ports, wherein said base path includes one or more of said switches and one or more of said trunks, and
         adding said base path to said VLAN including said starting access port and said another of said access ports;
      for each said two or more access ports not currently located in the VLAN:
         mapping a new path from said access port to one of said switches in said VLAN, adding said new path to said VLAN including said access port, and
         transmitting said VLAN to said VLAN database; and
      adding a new access port to an existing VLAN, if said searching results in locating the existing VLAN, by:
         determining a list of shortest paths with capacity for said new access port,
         performing one of determining a lowest hub value, if there is more than one path in the list of shortest paths, and
         adding said new access port to the existing VLAN, if there is at least one physical path.

20. The system of claim 19 wherein said network is the Internet.

21. The system of claim 19 wherein said network in an intranet.

22. The system of claim 19 wherein said VLAN database is a relational database.

23. A computer-readable storage medium having computer-executable instructions for facilitating design and assignment of Ethernet VLANs, wherein the computer-executable instructions when executed by a computer processor cause the computer processor to perform a method comprising:
   receiving by the computer processor a VLAN name, a class of service and two or more access ports, wherein a VLAN is a virtual local area networks;
   determining switches and trunks associated with said access ports;
   searching a VLAN database for said VLAN;
   creating a VLAN if said searching does not result in locating said VLAN, wherein said creating includes:
      selecting a starting access port from said two or more access ports,
      mapping a base path from said starting access port to another of said access ports, wherein said base path includes one or more of said switches and one or more of said trunks, and
      adding said base path to said VLAN including said starting access port and said another of said access ports;
   for each said two or more access ports not currently located in the VLAN:
      mapping a new path from said access port to one of said switches in said VLAN,
      adding said new path to said VLAN including said access port, and transmitting said VLAN to said VLAN database; and
   adding new access port to an existing VLAN, if said searching results in locating the existing VLAN, by:
      determining a list of shortest paths with capacity for said new access port,
      performing one of determining a lowest hub value, if there is more than one path in the list of shortest paths, and
      adding said new access port to the existing VLAN, if there is at least one physical path.

* * * * *